Oct. 15, 1957 C. G. MUNTERS 2,809,818
GAS AND LIQUID CONTACT APPARATUS
Filed June 21, 1956 2 Sheets-Sheet 1

INVENTOR.
CARL GEORG MUNTERS
BY

Oct. 15, 1957  C. G. MUNTERS  2,809,818
GAS AND LIQUID CONTACT APPARATUS
Filed June 21, 1956  2 Sheets-Sheet 2

INVENTOR.
CARL GEORG MUNTERS
BY

United States Patent Office 2,809,818
Patented Oct. 15, 1957

2,809,818

GAS AND LIQUID CONTACT APPARATUS

Carl Georg Munters, Stockholm, Sweden

Application June 21, 1956, Serial No. 592,786

Claims priority, application Sweden June 23, 1955

12 Claims. (Cl. 261—24)

The present invention relates to improvements in gas and liquid contact apparatus and relates back to my prior application Serial No. 442,688, filed July 12, 1954, for all common subject matter and is a continuation-in-part thereof.

My prior application is directed to a gas and liquid contact apparatus of general application and discloses a packing having parallel sheets or foils for spreading liquid in thin films over a large surface area for contact by a gas. Features of invention in my prior application are the close spacing of the sheets and means to counteract the surface tension of the liquid tending to cause it to bridge the closely spaced sheets. Such a construction provides a large surface area per unit of volume of the packing and a high coefficient of performance.

One of the objects of the present invention is to provide a gas and liquid contact packing of the type indicated which further increases the surface area per unit of volume of the packing for any particular spacing of the partition wall.

Another object is to provide a gas and liquid contact packing divided by partition walls into a plurality of vertically arranged adjacent cells of very small cross sectional area with their outlet ends constructed to counteract the surface tension of the liquid tending to bridge and plug the cells.

Another object is to provide a packing of the type indicated which produces a uniform distribution of liquid throughout the packing.

Another object is to provide a packing of a thin light-weight low cost material which is absorbent enough to distribute liquid and having sufficient wet strength to support itself.

Still another object is to provide a gas and liquid contact packing of the type indicated which may be produced at such low cost as to make it economically feasible to replace the entire packing when fouled with dirt or mineral scale.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings:

Figure 1:
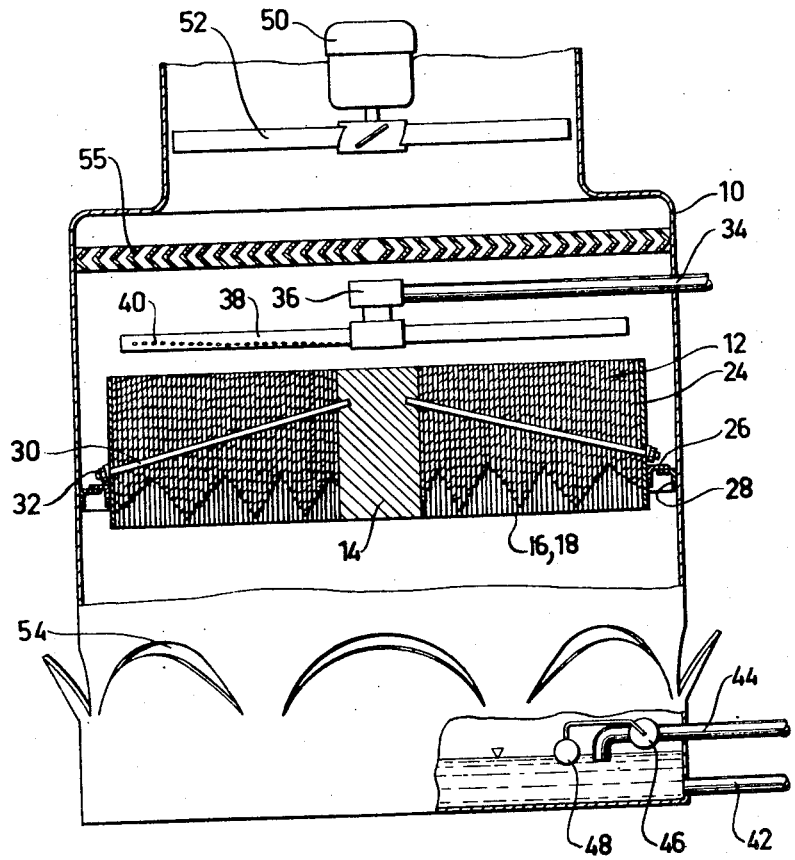
Figure 1 is a side elevational view of a cooling tower partly in section to show the cellular type packing of the present invention.

The gas and liquid contact packing of the present invention is adapted for general application, but is shown in the drawings as applied to a so-called cooling tower for cooling water by evaporative cooling. The packing comprises thin partition walls of a light-weight low cost material so arranged as to provide a series of adjacent parallel cells open at the top and bottom. Water supplied uniformly at the top of the packing is equally distributed by the vertical walls between parallel cells and flows downwardly over the walls of the cells in thin films. Simultaneously, air flows upwardly through the center of the cell for direct contact with the films of liquid. A small portion of the water evaporates into the air flowing through the cells and the latent heat of vaporization is removed from the water to reduce its temperature. However, the packing can be used in absorption, condensation or convection apparatus.

The partition walls may be arranged to provide cells having circular, rectangular or hexagonal shape in cross section. As the spacing between the partitioned walls forming the cells decreases, the surface area per unit of volume of the packing increases. It is therefore desirable to reduce the cross sectional area of the cells to a minimum to increase the surface area of the partitioned walls per unit of volume of the packing and produce a more intimate contact of the gas and liquid. However, cells of small cross sectional area produce a special problem in that the liquid tends to bridge between the partitioned walls by surface tension, especially at the lower outlet ends of the cells, and thus prevent the liquid from draining from the packing. In accordance with the present invention, the partitioned walls of the cells are closely spaced to provide a large surface area per unit of volume and an intimate contact of the liquid and gas, and the partitioned walls are preferably so constructed at their lower edges as to provide depending inclined surfaces along which the liquid will flow from each cell without bridging or plugging of the cells.

In a preferred embodiment, the packing is composed of alternate corrugated and plain sheets attached at their points of contact to provide a plurality of adjacent parallel cells between the flat and undulating folds of the sheets. The sheets may be made of chemically treated paper and the packing constructed in a very simple manner by accordion pleating one sheet, arranging the accordion pleated sheet between plain sheets and attaching the sheets at their point of contact in the same way that corrugated paper board is constructed. The undulating folds of the corrugated sheets provide the spacing of the partition walls of each cell and the edge portions of the assembled sheets provide large areas through which the liquid enters and leaves the packing. The large horizontal area at the top of the packing is divided by the ends of the partitioned walls forming the separate cells to provide for a uniform distribution of liquid throughout the packing. In order to relieve the surface tension or cohesion, the bottom edges of the sheets are preferably cut away at an acute angle to the vertical axes of the cells to form a series of adjacent notches. The angular edges of the notches form enlarged oval-shaped outlet openings at the lower ends of each cell and provide extended surfaces inclined downwardly from each cell on which the liquid flows away from the cells to prevent plugging of the cells by the liquid bridging the outlet ends thereof.

Figure 2:
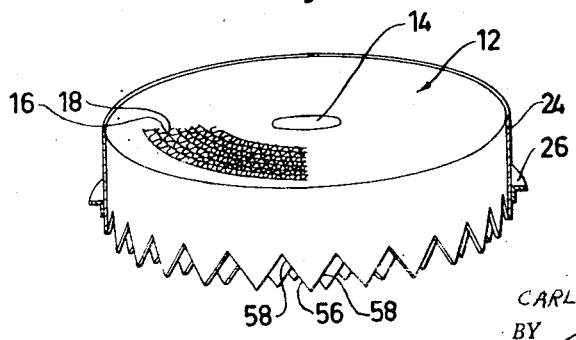
Figure 2 is a perspective view of the packing and showing the arrangement of alternate plain and corrugated sheets to provide a plurality of adjacent cells.
Figure 3:
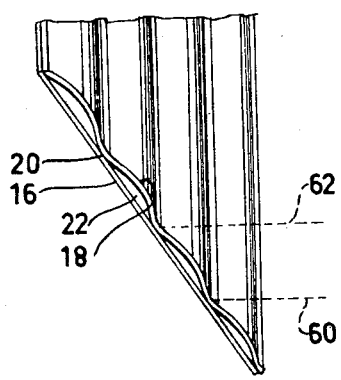
Figure 3 is a side elevation view of a portion of a pair of adjacent plain and corrugated sheets showing the inclined surfaces at the lower edges thereof along which the liquid flows from the cells.

Figure 1 of the drawings illustrates a gas and liquid contact apparatus having a packing incorporating the novel features of the present invention. The apparatus is shown in the form of a cooling tower having a casing 10 in which a gas and liquid contact packing unit 12 is mounted. As illustrated in Figures 1 to 3, the casing 10 and packing 12 are of circular form in cross section and the packing comprises a hub 14 on which a continuous ribbon of the packing material is wound in overlapping spiral layers. The continuous ribbon comprises superimposed flat and corrugated sheets 16 and 18 which are joined by means of an adhesive at the points of contact 20 of the crests of the corrugated sheet with the plain sheet, see Figure 3. The corrugations simulate a sine wave and have a wave length up to twice the height of the undulations. Preferably, each wound layer of the continuous ribbon is glued to the preceding layer where the crests of the corrugated sheet contact the plain sheet.

The rolled packing sheets 16 and 18 provide pipe-like channels or cells 22 in the spaces between the adjacent sheets 16 and 18 which extend vertically throughout the height of the packing and are open at the top and bottom. The circular unit of packing material 12 is enclosed by a cylindrical metal sleeve 24. Sleeve 24, in turn, has a horizontal flange 26 on its periphery which rests on and is supported by a similar flange 28 projecting inwardly from the casing 10. Flange 28 also serves as a seal to prevent air from flowing between the cylindrical sleeve 24 and casing 10. The spirally wound ribbon of packing material 12 is reinforced by spokes 30 extending radially from the hub 14 through the packing and metal sleeve 24. The outer ends of the spokes 30 are firmly attached to the sleeve 24 by a fastening means shown as nuts 32 screwed onto the threaded ends of the spokes against the side of the sleeve. Preferably the spokes 30 extend from the sleeve 24 upwardly at an angle toward the hub 14 to increase their effectiveness.

The sheets 16 and 18 are made of any suitable thin material which is moisture-absorbent or can be moistened by water. Preferably, the sheets 16 and 18 are composed of paper of a thickness as low as $\frac{1}{10}$ of a millimeter. Such paper has an extremely light weight and low cost compared to materials previously used and, due to the corrugated form of alternate sheets 18, provides the necessary strength to support itself in a unit pack. As the paper is contacted with liquid, it is important that it possesses the degree of wet strength required to support the weight of water passing through the packing at any particular time in addition to its own weight. For this purpose, the paper, either before or after it is wound in a spiral pack, is impregnated with a plastic material such as, for example, melamine, carbamide or phenol-formaldehyde resins. Such plastic material may constitute the adhesive or glue for connecting the sheets at their points of contact. In this connection it should be pointed out that the paper must not be impregnated with too much of the plastic material as this reduces its moisture or liquid absorbent qualities but should be impregnated with a sufficient quantity of the material to give it the wet strength required.

The distance between the flat sheets 16, or in other words, the height of the corrugations in the sheets 18 may vary for particular conditions of application. The closer the spacing the sheets, the greater the surface area per unit of volume and the greater the intimate contact of the liquid and gas. On the other hand, as the distance between the sheets decreases, the resistance to the flow of air through the cells increases and the cells are more apt to become plugged by dirt, mineral scale or liquid bridging the cells by surface tension of the liquid. When the packing material is used in a cooling tower, the spacing between the sheets is made small enough so that liquid would normally bridge between the walls at the outlet of the cells to insure a large surface area per unit of volume, but large enough in relation to the length of the cells to insure the flow of the required amount of air at the pressure drop available. In most cooling tower installations the spacing between plain sheets 16 is about 3 to 4 millimeters but may be increased above this range while still having the bridging problem and still obtaining the advantages of a large surface area per unit of volume of packing. With a spacing between plain sheets 16 of 5 millimeters and with corrugated sheet 18 having a length of a complete undulation equal to twice its height, the numerical value of the surface area in square millimeters will be substantially equal to the numerical value of the volume in cubic millimeters. As the spacing increases to 10 millimeters the numerical value of the surface area in square millimeters is approximately one half the numerical value of the volume in cubic millimeters and if further increased to 15 millimeters the ratio would decrease to almost one quarter.

Water is delivered onto the top of the packing 12 through a conduit 34 to the head 36 of a rotary sprayer 38. The rotary sprayer 38 has arms in the form of pipes projecting radially from the head 36 and provided with a plurality of orifices 40 arranged in spaced relation on a helical line along the pipe to project the water substantially horizontally at the outer ends of the arms and progressively downwardly from the horizontal from the outer to the inner ends of the arms. The purpose of this construction is to lay a sheet of water onto the top of the packing in amounts varying proportionately with the increase in surface area of the circular end of the packing from its inner to its outer periphery. Furthermore, the construction automatically rotates the arms by the reactive force of the jets of water issuing from the perforations 40 to lay a progressively advancing sheet of water on the packing. The water supplied from the sprayer arms 38 is uniformly distributed in the packing by the vertical partition walls formed by the plain and corrugated sheets 16 and 18 which divide the sheet of water and deliver equal amounts to the individual cells 22. The liquid flows by gravity down the side walls of the cells 22 in thin films.

A fan 52 is mounted in the open top of the casing 10 to produce a flow of air through the packing 12. Fan 52 is driven by a motor 50 to draw air through inlet openings in the casing below the packing 12 and upwardly through the cells 22 where it directly contacts the films of liquid on the walls thereof. A portion of the liquid is evaporated into the air and the heat of vaporization is removed from the water to reduce its temperature. A series of eliminator plates 55 are provided above the liquid distributing sprayer arms 38 to remove liquid held in mechanical suspension in the air before it leaves the tower. However, as a consequence of the cell structure of the packing and of the fact that the water leaving the sprayer 38 need not be atomized but is delivered to the top of the packing as more or less continuous jets to get the proper distribution over the surfaces of the packing, such suspension becomes so small that the eliminator plates 55 may even be dispensed with.

The water cooled by the packing 12 flows to a sump tank in the base of the casing 10 from which it is delivered through a conduit 42 to the place where it is to be used. The water is returned to the tower through the conduit 34 to the sprayer arms 38. A supply pipe 44 also is provided for delivering additional water from any suitable source such as a city main as controlled by a valve 46 operated by a float 48 in the sump tank to provide make-up water in amounts at least equal to that evaporated in the packing 12.

Also, in accordance with the present invention the pair of plain and corrugated sheets 16 and 18 forming the ribbon, which is wound into a pack, have their lower edges cut on lines 58 extending at equal and opposite angles to the vertical to provide a series of successive notches or serrations terminating in depending points 56. Thus, the walls forming the cells 22 are cut at an angle to the axis of the cells to extend and enlarge the outlet openings as shown in Figure 3. The angle of the serrated edges should be correlated with the cross sectional area of the cells 22 to produce a height between lines 60 and 62, see Figure 3, at least as great as and preferably greater than that necessary to counteract the hydrostatic head produced by the surface tension of the liquid tending to bridge the outlet openings from the cells. For example, with plain sheets 16 spaced about 4 millimeters, the sides 58 of the serrations may have an acute angle with respect to the vertical of as little as 15 degrees to produce the hydrostatic head required to break the surface tension. Furthermore, the serrated bottom edge of each layer of plain and corrugated packing sheets 16 and 18 provides inclined surfaces along which liquid will flow by gravity to the points 56 for continually draining the liquid from the bottom of the cells to maintain them open so that air can freely enter the cells for flow therethrough. In other words, the water flows down the inclined surfaces 58 away from the cells 22 to prevent blocking or plugging the cells by water clinging thereto.

As the cross sectional area of the cells decreases, the transfer coefficient and ratio of surface area to volume will increase, but the angle to the vertical of the draining edges 58 of the serrations at the bottom of the packing must be correspondingly decreased. Thus, the steepest angle to the vertical at which the draining surfaces can be made limits the cross sectional area of the cells for all practical purposes. For example, in designing the packing, consideration must be given to the vertical dimensions of the cells 22 to produce the desired temperature drop, the volume of liquid required and the pressure drop in the air stream that can be produced by the particular fan to be used. The spacing of the sheets 16 and the minimum cross sectional area of the cells 22 can then be determined by the permissible angle of the serrations to produce the average length of cells required. The minimum cross sectional area of the cells 22 then will be the one at which liquid will flow from the cells without plugging at the particular angle of the serrations. The cross sectional area of the cells 22 should be made greater than the optimum to insure proper operation. The average length of the cells 22 with a spacing of 4 millimeters between sheets 16 may be in the range of 150 to 400 millimeters. A surprising result experienced with packing made in accordance with the present invention is the period of time that it may be used without appreciable effect from the build up of mineral scale in the small cells 22 when hard water is used. It is not known whether this improvement results from the paper material used or a more active flushing of small crystals of precipitate before they accrete on the wall. However, when the scale does accumulate to a degree that interferes with the proper operation of the tower, the packing may be replaced economically, due to its low initial cost.

Figure 4:
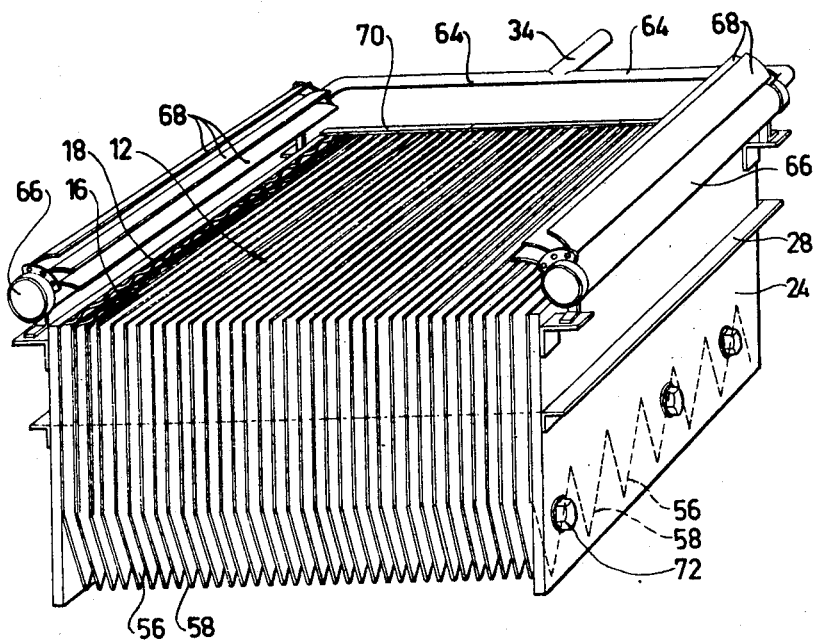
Figure 4 is a perspective view of a packing of modified construction.

A modified construction is illustrated in Figure 4 in which the packing unit is of rectangular shape with the plain and corrugated sheets 16 and 18 stacked in adjacent side by side relationship. Water to be cooled is delivered through conduit 34 having branches 64 connected to oppositely arranged sprayers 66. In the modified construction the sprayers are stationary and have deflecting baffles 68 extending at different angles with respect to the top of the packing and between which water is sprayed through orifices in the sprayers 66. In the construction illustrated in Figure 4, the notches are sawed or cut in the edges of the stacked sheets instead of a pair of sheets being stamped or cut before being wound into a roll as in the embodiment illustrated in Figures 1 to 3. Thus, the serrations are formed in parallel rows which extend perpendicularly to the plane of the paper sheets.

A stack of the packing sheets 16 and 18 are mounted in a frame 24 and the frame may have battens 70 at each end to hold the sheets in place and provide for sealing the ends of the sheets. The packing 12 is supported in the frame 24 by means of bolts 72 which extend between the sides of the frame and through the packing sheets.

While two embodiments of the invention are herein illustrated and described, it will be understood that further modifications may be made in the construction and arrangement of elements without departing from the spirit or scope of the invention. For example, the gas and liquid contact packing may be constructed of a plurality of straw tubes arranged in adjacent parallel relationship, the bottom edges may be serrated at an angle to the plane of the sheet instead of at an angle to the end of the sheets, and the cells may be formed by paper sheets attached to each other to form a honeycomb construction. In cases where the packing is used for evaporative cooling air while the water merely serves the purpose of wetting the surfaces of the cells, the flow of the two media therethrough may be in the same direction. Therefore without limitation in this respect, the invention is defined by the following claims:

I claim:

1. In a gas and liquid contact apparatus, the combination with the elements of such an apparatus of a packing comprising thin partition walls, at least a portion of said walls undulating so as to engage other of said walls at spaced intervals to mutually support each other and define a mass of adjacent peripherally enclosed tubular cells open at the top and bottom, means for supplying liquid onto the top of the packing which is divided by the edges of the walls at the open top of adjacent cells to distribute the liquid across the packing, said divided liquid flowing downwardly on each side of the common partition walls between cells for maintaining films of liquid thereon for contact with gas flowing through the cells, the cross-sectional areas of the cells being so small that liquid can bridge the walls of the cells by surface tension whereby to provide a large surface area per unit of volume of said packing, and means for breaking the bridging of the liquid to cause it to flow from the lower ends of the cells and thereby provide openings for the flow of gas through the cells.

2. In a gas and liquid contact apparatus, the combination with the elements of such an apparatus of a packing comprising thin partition walls, at least a portion of said walls undulating so as to engage other of said walls at spaced intervals to mutually support each other and define a mass of adjacent peripherally enclosed tubular cells open at the top and bottom, means for supplying liquid onto the top of the packing, which is divided by the edges of the walls at the open top of adjacent cells to distribute the liquid across the packing, said divided liquid flowing downwardly on each side of the common partition walls between cells for maintaining films of liquid thereon for contact with gas flowing through the cells, the cross-sectional area of the cells being so small that liquid can bridge the walls of the cells by surface tension whereby to provide a large surface area per unit of volume of said packing, and liquid draining surfaces projecting downwardly from the cells to break the bridging of said liquid to cause it to flow away from the cells and maintain the lower ends open for the flow of gas thereto.

3. A gas and liquid contact apparatus in accordance with claim 1 in which the partition walls of the packing are formed by plain and corrugated sheets of a fibrous material which absorbs liquid and with each corrugated sheet arranged between plain sheets.

4. A gas and liquid contact apparatus in accordance with claim 3 in which the cells are formed between the alternate plain and corrugated sheets, and the lower edges of said sheets are cut on a bias to form elongated openings at the lower ends of the cells and inclined surfaces from which the liquid drains without bridging the openings.

5. A gas and liquid contact apparatus in accordance with claim 4 in which the cells are formed between the alternate layers of flat and corrugated sheets, and the lower edges of said sheets are cut at an angle to the parallel cells so that the outlet openings from the adjacent cells are located at progressively lower levels.

6. A gas and liquid contact apparatus in accordance with claim 1 in which the cells are of such small dimensions that the numerical value of the surface area in square millimeters is at least one half the numerical value of the volume in cubic millimeters.

7. A gas and liquid contact apparatus in accordance with claim 1 in which the packing is formed by plain and corrugated sheets of a fibrous material with the corrugated sheet positioned between plain sheets, and the spacing between the plain sheets being less than one centimeter.

8. In a gas and liquid contact apparatus, the combination with the elements of such an apparatus of a packing comprising thin partition walls of fibrous material impregnated with a substance to provide the wet strength required while maintaining it absorbent, at least a portion of said partition walls undulating so as to engage other of said walls at spaced intervals to mutually support each other and define a mass of adjacent peripherally enclosed tubular cells opened at the top and bottom, means for supplying liquid onto the top of the packing which is divided by the edges of the partition walls at the open top of adjacent cells to cause liquid to be supplied to the cells, said divided liquid flowing downwardly on each side of the common partition walls between cells for maintaining films of liquid thereon for contacting gas flowing through the cells, the cross-sectional area of the cells being so small that liquid can bridge the walls of the cells by surface tension whereby to provide a large surface area per unit of volume of said packing, and means to cause gas and liquid to flow through the cells.

9. In a gas and liquid contact apparatus, the combination with the elements of such an apparatus of a packing comprising thin partition walls of a fibrous material impregnated with a substance to provide the wet strength required while maintaining it absorbent, at least a portion of said partition walls undulating to engage other of said walls at spaced intervals to mutually support each other and define a mass of adjacent parallel peripherally enclosed tubular cells open at the top and bottom, means for supplying liquid onto the top of the packing which is divided by the edges of the walls at the open top of adjacent cells to distribute the liquid across the packing, said divided liquid flowing downwardly on each side of the common partition walls between cells for maintaining films of liquid thereon for contact with gas flowing through the cells, the cross-sectional area of the cells being so small that liquid can bridge the walls of the cells by surface tension whereby to provide a large surface area per unit of volume of said packing, and liquid draining surfaces projecting downwardly from the cells to break the bridging of said liquid to cause it to flow away from the cells and maintain the lower ends of the cells open for the flow of air thereto.

10. A packing unit for a tower in which a gas and liquid contact each other comprising thin partition walls, at least a portion of said walls undulating to engage other of said walls at spaced intervals to mutually support each other and form a mass of adjacent peripherally enclosed tubular cells extending between opposite sides of the packing and open at both ends to allow liquid to flow through said cells, the dimensions of the cells being so small that liquid having substantially the surface tension characteristics of water can bridge the walls of the cells by surface tension whereby to provide a large surface area per unit of volume of the packing, and means at one side of said packing for breaking the bridging of the liquid to cause it to drain continuously from the ends of the tubular cells to maintain the cells open.

11. A packing unit for a tower in which gas and liquid contact each other comprising thin partition walls, at least a portion of said walls undulating to engage other of said walls at spaced intervals to mutually support each other and form a mass of adjacent peripherally enclosed tubular cells extending between opposite sides of the packing and open at both ends to allow liquid to flow through the cells, the dimensions of the cells being so small that liquid having substantially the surface tension characteristics of water can bridge the walls of the cells by surface tension whereby to provide a large surface area per unit of volume of the packing, and the liquid discharge ends of said cells being angularly disposed to a vertical plane to drain liquid continuously from the ends thereof.

12. A packing unit for a tower in which gas and liquid contact each other in accordance with claim 11 in which the partition walls comprise a stack of corrugated sheets, and the liquid draining surface comprise a series of serrations on each sheet at one side of the packing and having inclined sides cut along a plurality of adjacent cells at an angle thereto, and said inclined sides of the serrations extending along an individual cell a distance greater than the capillary rise of liquid therein.

References Cited in the file of this patent

UNITED STATES PATENTS

| | | |
|---|---|---|
| 199,492 | Balmore | Jan. 22, 1878 |
| 869,747 | Starr | Oct. 29, 1907 |
| 2,231,088 | Richardson | Feb. 11, 1941 |
| 2,317,951 | Burk | Apr. 27, 1943 |
| 2,637,540 | Rowe | May 5, 1953 |